3,158,886
FILM CLEANING APPARATUS
David D. Grimes, Silver Spring, Md., assignor to The
Richards Corporation, Arlington, Va., a corporation of
Virginia
Filed Apr. 17, 1962, Ser. No. 188,211
6 Claims. (Cl. 15—100)

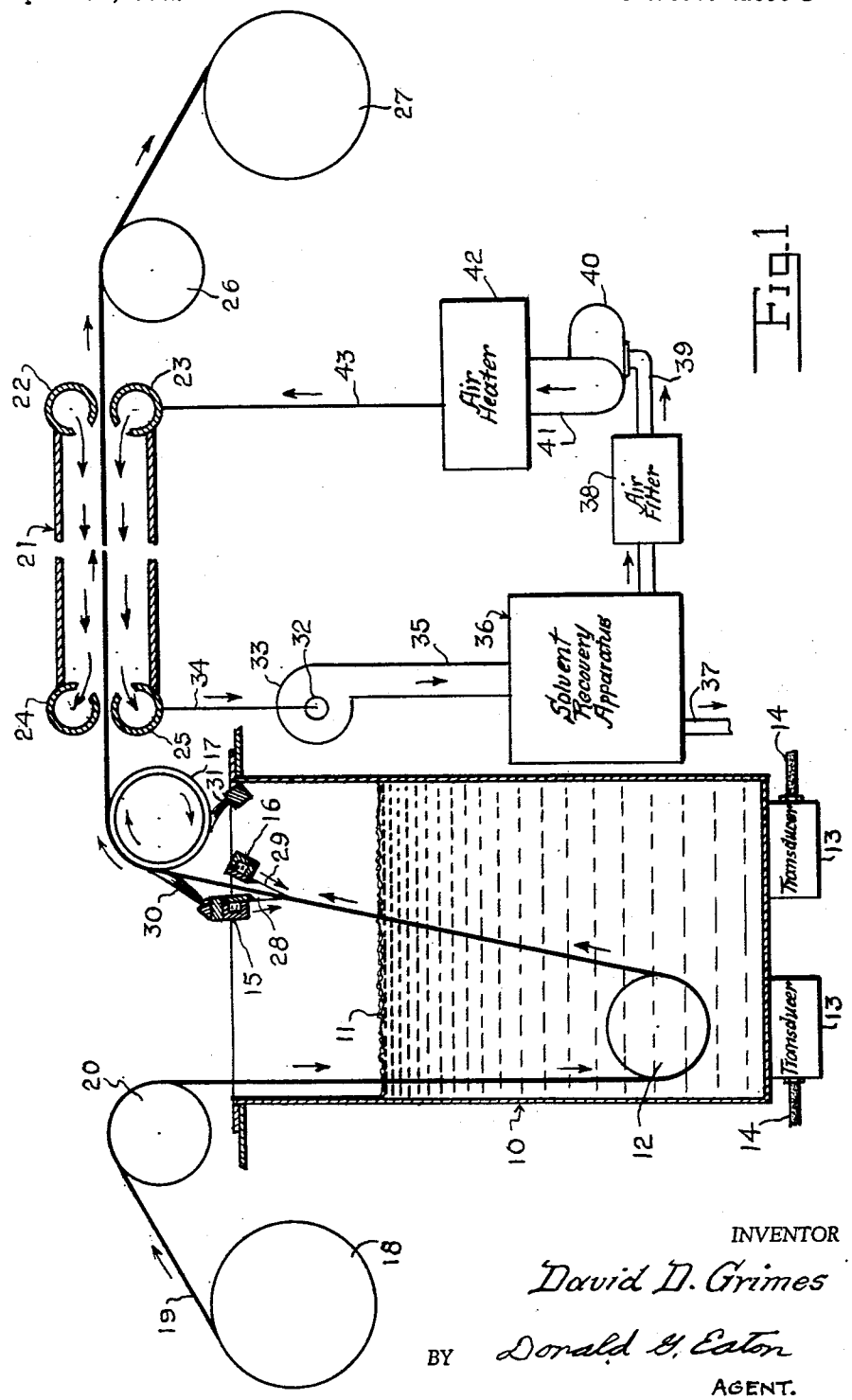

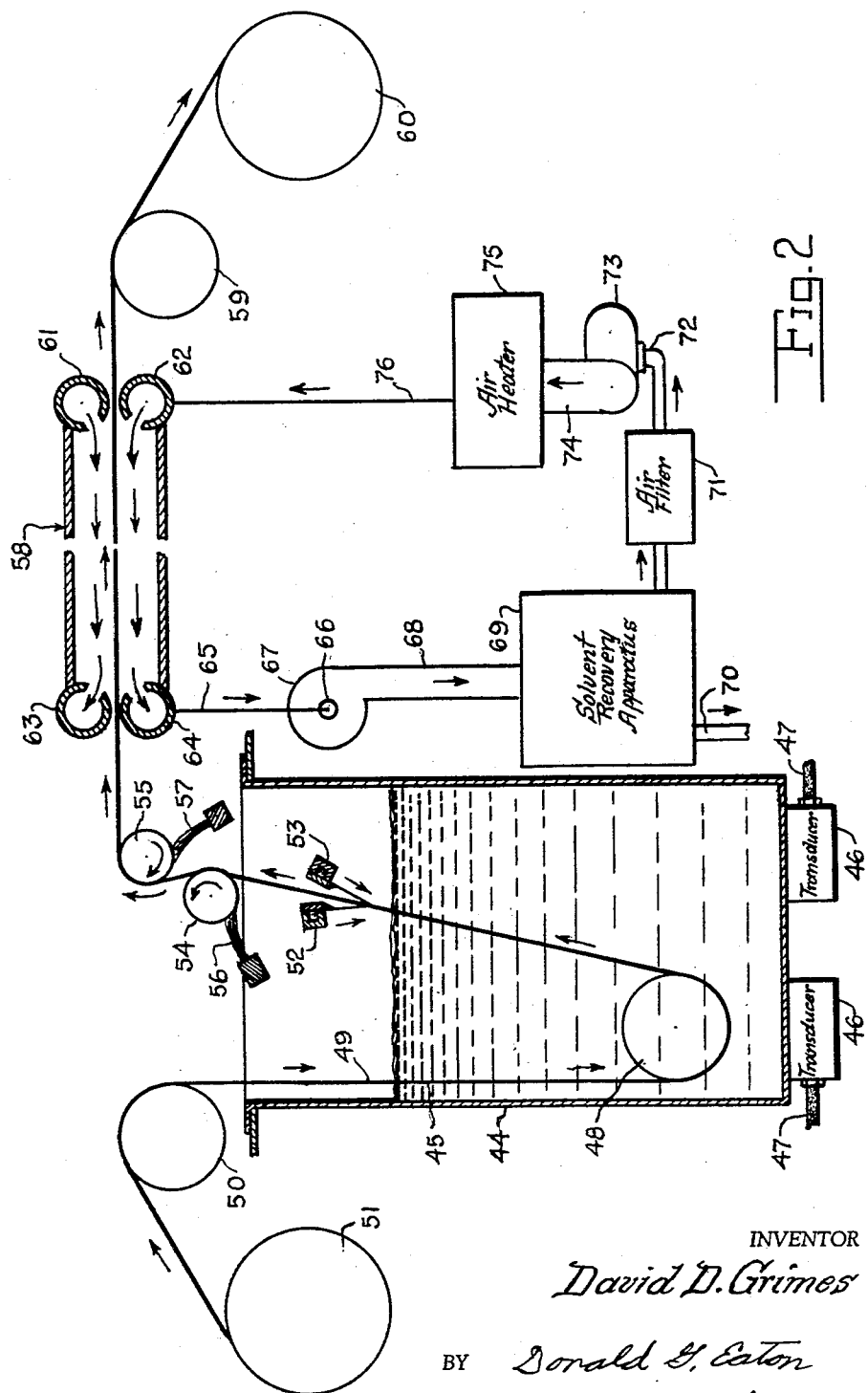

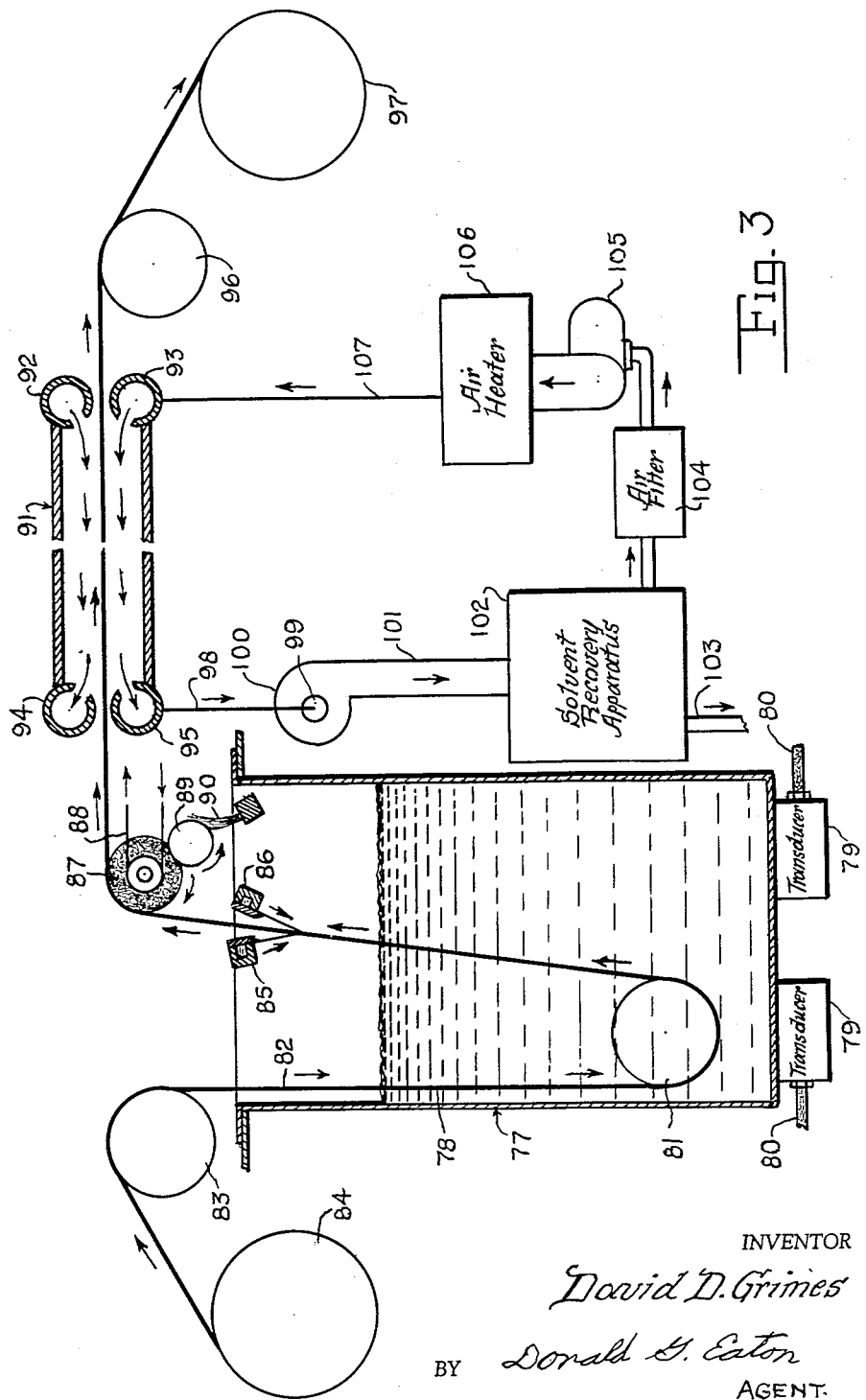

This invention relates to the removal of foreign matter from film-like material and more particularly to a cleaning apparatus for removing foreign matter from relatively wide photographic film, magnetic tape or any other similar material from which it is desired to remove substantially all foreign matter continuously and at a relative rapid rate without damage or other adverse effects to the film and also without leaving solvent or other residue on such film.

As is well known, photographic film and other similar material have a particular affinity for dust and other foreign matter, such as grease, oil, fingerprints or the like and the cleaning of such film, particularly in the wider widths, has heretofore presented a particularly troublesome problem, in that the removal of such foreign matter without damage to the film is extremely difficult and furthermore, substantially perfect cleaning of film at a rate sufficient to be commercially practical has not been possible with previously utilized methods and apparatus. While prior apparatus and methods has been utilized with some degree of success for cleaning motion picture film and other types of relatively narrow film for commercial usage, nevertheless, the degree of cleaning provided by such prior art methods and apparatus has not been sufficient to permit use of the same in connection with relatively wide films utilized for aerial photography where the degree of magnification in reproduction is such as to render unacceptable the present of relatively minute particles of foreign matter which in the case of motion picture or other commercial film would be entirely acceptable.

With the development of aerial cameras and films providing a high degree of resolution and an almost complete elimination of grain, which characteristics were heretofore unknown, the problem of foreign matter on the film has become particularly acute and in order to realize the ultimate capabilities of the present day film and cameras, it has been necessary to develop an entirely new apparatus for cleaning such film to a degree sufficient to permit maximum magnification without degradation of the resulting product as the result of foreign matter on the film.

Heretofore motion picture and other relatively narrow commercial films have been cleaned by the use of a solvent bath agitated by ultrasonic energy, the solvent being removed from the film by means of an air blast impinging thereon and while this type of cleaning was superior to previously known methods, nevertheless, the same does not provide a degree of cleaning sufficient for aerial photographic films and furthermore, the use of an air blast for removing the solvent from relatively wide film often resulted in damage to the film by reason of flutter and furthermore, this does not provide for complete removal of the contaminated solvents from the film which, therefore, dries thereon leaving a residue which, while acceptable for motion picture and other commercial standards, is not acceptable in the field of aerial photography. Furthermore, the use of an air blast impinging on the film introduces the possibility of contaminating the film by atmospheric dust and vapors and also such an air blast would tend to further embed foreign particles remaining on the film after passage through the solvent bath, thereby rendering further cleaning of the film difficult, if not impossible.

It is accordingly an object of this invention to provide a film cleaning apparatus which will operate to remove substantially all foreign material from film without damage thereto.

A further object of the invention is the provision of a film cleaning apparatus utilizing an ultrasonically agitated solvent bath for removing foreign material from the film and also utilizing a liquid knife means for stripping contaminated solvent from the film and for rinsing additional foreign material therefrom.

A still further object of the invention is the provision of a film cleaning apparatus for relatively wide film, this apparatus utilizing an ultrasonically agitated solvent bath, together with liquid knife means for removing foreign material from the film and for stripping contaminated solvent therefrom, the apparatus further including means for removing the major portion of the solvent from the film and drying means for evaporating the remaining solvent from the film.

Another object of the invention is the provision of film cleaning apparatus utilizing an ultrasonically agitated solvent bath, together with liquid knife means for removing foreign material from the film and also for stripping a major portion of the solvent therefrom, together with a drain roll engaging one side of the film for removing additional solvent therefrom, a drain brush engaging the opposite side of the film for removing additional solvent therefrom and a drain brush engaging the drain roll for removing solvent from such roll.

A further object of the invention is the provision of film cleaning apparatus utilizing an ultrasonically agitated solvent bath, together with liquid knife means for removing foreign material from the film and also for removing a major portion of the solvent therefrom, together with a drain roll engaging one side of the film and a second drain roll engaging the opposite side of the film for removing additional solvent therefrom and drain brushes engaging the drain rolls for removing solvent from such rolls.

A still further object of the invention is the provision of film cleaning apparatus utilizing an ultrasonically agitated solvent bath, together with liquid knife means for removing foreign material from the film and for stripping a major portion of the solvent therefrom, together with a solvent absorbing driven roll engaging one side of the film to remove additional solvent therefrom, a squeeze roll engaging the absorbing roll for removing solvent therefrom and a drain brush engaging the squeeze roll for removing solvent from such roll.

Another object of the invention is the provision of film cleaning apparatus utilizing an ultrasonically agitated solvent bath, together with liquid knife means for removing foreign material from the film and for stripping a major portion of the solvent therefrom, together with means for removing additional solvent from the film and a drying chamber through which the film passes and through which warm air is circulated for evaporating the remaining solvent from the film, the temperature of the air circulating through the drying chamber being adjusted to a degree sufficient to compensate for heat loss due to evaporation of the solvent thereby preventing damage to the film by reason of thermal shock.

A further object of the invention is the provision of film cleaning apparatus utilizing an ultrasonically agitated solvent bath, together with liquid knife means for removing foreign material from the film and for stripping a major portion of the solvent therefrom, together with means for removing additional solvent and a drying chamber through which the film passes, warm air being circulated through the chamber in counter-current relationship to the film to evaporate the remaining solvent therefrom, the air being exhausted from the drying chamber and passed through a solvent recovery apparatus to remove solvent therefrom for reuse, the air thereafter, being passed through an air filter and an air heater to the drying chamber for re-circulation therethrough.

A still further object of the invention is the provision of a film cleaning apparatus utilizing an ultrasonically agitated solvent bath, together with liquid knife means for removing foreign material from the film and for stripping a major portion of the solvent therefrom and means for removing additional solvent from the film, the film thereafter passing through a drying chamber through which warm air circulates for evaporating the remaining solvent from the film, the air being exhausted from the drying chamber and passed through a solvent recovery apparatus to remove vaporized solvent therefrom for reuse.

Further objects and advantages of the invention will be apparent from the following description taken in conjunction with the accompanying drawings wherein:

FIG. 1 is a diagrammatic view showing a film cleaning apparatus constructed in accordance with this invention and also showing the solvent recovery apparatus, together with an air filter and air heater utilized in connection with the cleaning apparatus;

FIG. 2 is a view similar to FIG. 1, but showing a modified means for removing cleaning solvent from the film; and FIG. 3 is a view similar to FIG. 1, but showing a still further modified form of means for removing cleaning solvent from the film.

With continued reference to the drawings and particularly FIG. 1, there is shown a film cleaning apparatus primarily intended for use with relatively wide film, the apparatus being constructed in accordance with this invention and which may well include a suitable tank 10 for receiving a cleaning solvent and such solvent may terminate below the top of the tank, the surface of the solvent being shown at 11. Disposed within the tank adjacent the lower end thereof and below the level of solvent in the tank is a film guide roll 12 which is mounted for free rotation and the purpose of such roll will be later described. Attached to the bottom of the tank 10 are a suitable number of transducers 13 which may be connected through conductors 14 to a suitable ultrasonic generator apparatus and by means of such generator and the transducers 13 the solvent bath in the tank 10 is agitated ultrasonically to perform a cleaning function in a manner well known in the art. The ultrasonic generator apparatus, as well as the transducers 13 are conventional commercial equipment and accordingly, no detailed description of such apparatus is considered desirable or necessary, it only being necessary to provide such apparatus capable of generating sufficient ultrasonic energy at the optimum frequency for performing the desired cleaning operation.

Disposed above the surface 11 of the solvent in the tank 10 are a pair of nozzles to provide a liquid knife means, the purpose and operation of which will be later described and mounted above the nozzles 15 and 16 for free rotation is a drain roll 17.

A suitable film supply reel 18 may be mounted for free rotation in any desired manner adjacent the tank 10 and a supply of film to be cleaned is carried by the reel 18 and from such reel the film 19 passes over a film guide roll 20 mounted for free rotation and downwardly into the tank 10 and around the film guide roll 12 disposed in the lower portion of the tank 10 and upwardly between the nozzles 15 and 16 and over the drain roll 17. The base side of the film 19 contacts the guide roll 12, while the emulsion side of the film contacts the drain roll 17. From the drain roll 17 the film 19 passes through a drying chamber 21 and such chamber may be provided with upper and lower air inlet manifolds 22 and 23 adjacent the exit end of the chamber 21, while air outlet or exhaust manifolds 24 and 25 may be provided adjacent the entrance end of the drying chamber 21. From the drying chamber 21 the film 19 passes over a freely rotatable guide roll 26 and onto a film takeup reel 27. The takeup reel 27 may be suitably driven to wind the cleaned and dryed film 19 thereon.

The nozzle 15 is connected to a suitable source of liquid solvent under pressure and the nozzle 19 serves to project a solid unbroken sheet of liquid solvent 28 against the base side of the film 19. In a similar manner, the nozzle 16 is also connected to a suitable source of liquid solvent under pressure and this nozzle also serves to direct a solid unbroken sheet of liquid solvent 29 against the emulsion side of the film at a point directly opposite the sheet 28. As clearly shown in FIG. 1, the solvent sheets 28 and 29 are directed downwardly and inwardly toward the film 19 and into engagement therewith and the angle between each of the solvent sheets 28 and 29 and the film 19 is not greater than 15 degrees and this serves to provide a liquid knife means which performs a very important function in the cleaning operation which will be presently described. Mounted on the nozzle 15, or in any other suitable manner, is a drain brush 30 which engages the base side of the film 19 across the entire width thereof and in a similar manner, a drain brush 31 is mounted on the tank 10 or in any other suitable manner and engages the surface of the drain roll 17 across the entire width thereof. The material of the brushes 30 and 31 may be nylon and is of such soft flexible character that no damage to the film 19 or the roller 17 will result.

In operation, the film 19 passes through the path of solvent in the tank 10 and with the transducers 13 energized from a suitable ultrasonic generator, the solvent bath in the tank 10 is ultrasonically agitated to remove foreign material from the film 19. From the solvent bath in the tank 10, the film 19 passes upwardly between the nozzles 15 and 16 and the liquid solvent sheets 28 and 29 impinging against the opposite surfaces of the film 19 operate to strip contaminated solvent therefrom, returning such solvent to the tank 10 and the liquid sheets 28 and 29 further serve to rinse the surfaces of the film 19 to remove additional foreign material therefrom. The angle between the liquid sheets 28 and 29 of the liquid knife means and the film 19 serve to provide an aspirating action which strips approximately fifty percent of the contaminated solvent from the surface of the film 19 and returns such solvent to the tank 10. It is, of course, understood that the solvent flowing from the nozzles 15 and 16 in the form of unbroken solid sheets is clean solvent and, therefore, the liquid knife means also provides a rinsing action which is particularly effective in removing foreign material which was not removed in the ultrasonic bath in the tank 10. The relatively low angle between the solvent sheets 28 and 29 and the film 19 and the fact that such sheets impinge upon the opposite sides of the film in directly opposite locations precludes any danger of damage to the film, by reason of flutter and by reason of the stripping action of the sheets 28 and 29, foreign material is removed from the surface of the film 19, rather than embedded therein.

As the film 19 passes upwardly from the liquid knife means and over the drain roll 17 additional solvent is removed from the base side of the film by the drain brush 30 and additional solvent is removed from the emulsion side of the film by contact with the drain roll 17. Excess solvent removed from film by the drain roll 17 returns to the tank 10 and solvent adhering to the surface of the drain roll 17 is removed therefrom by the drain brush 31 and returned to the tank 10. The supply of clean solvent pouring from the nozzles 15 and 16 serve to maintain a clean supply of solvent in the tank 10 and, of course, the solvent therein is continuously circulated through a suitable refrigerating and filtering means to maintain the solvent at the desired temperature and also to remove foreign material therefrom. Since the refrigerating apparatus and filtering means is entirely conventional, no useful purpose is seen in illustrating or describing such apparatus in detail, it only being necessary to indicate that such apparatus is utilized in connection with this cleaning apparatus.

The warm air flowing through the drying chamber 21 in counter-current relationship to movement of the film 19 therethrough serves to evaporate any solvent remaining on the film 19 and the temperature of the air flowing through the drying chamber 21 is adjusted to a degree which compensates for the loss of heat due to evaporation of solvent on the film 19. In practice, it has been found necessary to adjust the temperature of the air flowing through the drying chamber 21 to a point only slightly above ambient temperature in order to provide complete drying and evaporation of the solvent on the film 19 and, therefore, as stated above, this results in compensating for loss of heat due to evaporation of the solvent and also prevents damage to the film 19 due to thermal shock, since during the entire cleaning and drying operation the film 19 remains relatively close to ambient temperature.

While the air flowing from the drying chamber 21 may be exhausted to the atmosphere, nevertheless, a certain portion of vaporized solvent is contained in such air and accordingly, where the air is exhausted to the atmosphere, such solvent is lost. It is, therefore, highly desirable to provide means for recovering solvent vaporized in the drying chamber 21 and for this purpose as shown in FIG. 1, the intake opening 32 of a blower 33 may be connected through a suitable conduit 34 to the air exhaust manifolds 24 and 25 adjacent the entrance end of the drying chamber 21. The discharge connection of the blower 33 may be connected through a suitable conduit 35 to a solvent recovery apparatus shown generally at 36 and this recovery apparatus may be of any suitable type which will operate to remove vaporized solvent present in the air discharged from the drying chamber 21. The solvent recovery apparatus 36 may be provided with a solvent drain connection 37 by means of which recovered solvent may be returned to the solvent supply container for re-use in the cleaning apparatus.

While if desired, the solvent free air discharged from the solvent recovery apparatus 36 may be exhausted to the atmosphere preferably such air is circulated through a suitable air filter 38 and through a conduit 39 to the intake connection of a blower 40. From the discharge connection of the blower 40, the air flows through a conduit 41 to an air heater 42 which serves to heat the air to the desired temperature from which the air flows through a suitable conduit 43 to the air inlet manifold 22 and 23 adjacent the exit end of the drying chamber 21. Such air is then recirculated through the chamber 21 for evaporating solvent from the film 19.

By use of the above described solvent recovery apparatus as well as air filtering and heating means, a closed air circuit is provided for supplying air to the drying chamber 21 and consequently the danger of contaminating the drying air with dust, vapors or other undesirable products is substantially eliminated.

With particular reference to FIG. 2, there is shown a film cleaning apparatus which in many respects is similar to that described above in connection with FIG. 1 and as a consequence, the apparatus shown in FIG. 2 may well include a tank 44 for receiving a solvent bath 45 and secured to the lower end of the tank 44 are transducers 46 connected by conductors 47 to a suitable ultrasonic generator for providing ultrasonic agitation of the solvent 45 in the tank 44. Disposed adjacent the lower end of the tank and rotatably mounted therein is a film guide roll 48 and this roll 48 serves to receive and guide film 49 passing over a film guide roll 50 from a film supply reel 51. From the guide roll 48 the film 49 passes upwardly through the solvent bath 45 and between nozzles 52 and 53 which serve to provide a liquid solvent knife means of the same nature as described above in connection with FIG. 1.

Mounted above the nozzles 52 and 53 is a freely rotatable drain roll 54 and mounted above the drain roll 54 and in offset relationship thereto is a second drain roll 55. As clearly shown in FIG. 2, the film 49 passing upwardly from between the nozzles 52 and 53 passes between the drain rolls 54 and 55 with the base side of the film 49 engaging the drain roll 54 and the emulsion side of the film 49 engaging the drain roll 55. A drain brush 56 is mounted in any suitable manner and engages the surface of the drain roll 54 and a second drain brush 57 is also mounted in any suitable manner and engages the drain roll 55.

From the drain roll 55 the film 49 passes through a drying chamber 58 over a film guide roll 59 and onto a film take-up roll 60 which may be driven in any suitable manner.

The drying chamber 58 is provided with air inlet manifolds 61 and 62 adjacent the exit end and adjacent the entrance end air exhaust or outlet manifolds 63 and 64 are provided. The air exhaust manifolds 63 and 64 may exhaust directly to the atmosphere or if desired, may be connected through a conduit 65 to the intake opening 66 of a blower 67, the discharge connection of which is connected through a conduit 68 to a solvent recovery apparatus 69 which serves to recover vaporized solvent from the air flowing from the drying chamber 58, such solvent being returned to the solvent supply container for the cleaning apparatus through a suitable drain connection 70. From the solvent recovery apparatus 69, the air flows through an air filter 71 to the intake connection 72 of a blower 73 from which the air flows through a suitable conduit 74 to an air heater 75 and through a conduit 76 to the air intake manifolds 61 and 62 of the drying chamber 58. The operation of this portion of the apparatus is the same as that described above in connection with FIG. 1.

In the form of the invention shown in FIG. 2, the solvent remaining on the film 49 after passing between the liquid knife nozzles 52 and 53 is removed by means of the drain rolls 54 and 55 engaging opposite sides of the film 49 and any solvent adhering to the rolls 54 and 55 is removed therefrom by means of the drain brushes 56 and 57, such solvent returns to the tank 44.

With particular reference to FIG. 3, there is shown a still further modified form of cleaning apparatus in which the major difference resides in the manner of removing solvent from the cleaned film and as a consequence, there may be provided a tank 77 for receiving a solvent bath 78 and as before, transducers 79 are secured to the bottom of the tank 77 and are connected through conductors 80 to a suitable ultrasonic generator. Disposed in the tank 77 adjacent the lower end thereof is a freely rotatable film guide roll 81 for receiving and guiding a film 82 to be cleaned which passes over a guide roll 83 from a film supply reel 84. From the guide roll 81 in the tank 77 the film 82 passes upwardly between nozzles 85 and 86 which provide a liquid solvent knife means of the same character as described above in connection with the other forms of the invention.

Mounted above the nozzles 85 and 86 is a drain roll 87 of sponge-like solvent absorbent material such as polyurethane and the roll 87 may be driven in any suitable manner, as by a belt 88. Engaging the sponge-like absorbent drain roll 87 is a squeeze roll 89 and engaging the squeeze roll 89 is a drain brush 90 mounted in any suitable manner.

From the drain roll 87 the film 82 passes through a drying chamber 91 provided at the exit end with air inlet manifolds 92 and 93 and at the entrance end, with air outlet or exhaust manifolds 94 and 95. From the drying chamber 91 the film 82 passes over a film guide roll 96 and onto a film take-up reel 97 which may be driven in any suitable manner.

The air outlet or exhaust manifolds 94 and 95 may, if desired, exhaust directly to the atmosphere, but preferably such manifolds are connected through a conduit 98 to the intake connection 99 of a blower 100, the discharge connection of which is connected through a conduit 101 to a solvent recovery apparatus 102. Such recovery apparatus serves to remove vaporized solvent from the air flowing from the drying chamber 91 and such solvent is returned through a suitable drain connection 103 to the solvent supply container for reuse in the cleaning apparatus. Air flows from the solvent recovery apparatus 102 through an air filter 104 to a blower 105 from which the air flows through an air heater 106 and through a conduit 107 to the air inlet manifolds 92 and 93 of the drying chamber 91 to be re-circulated therethrough in counter-current relationship to movement of the film 82 through the drying chamber 91. The operation of the solvent recovery apparatus, air filter and air heater is the same as that described above in connection with the other forms of the invention.

In the operation of the form of the invention shown in FIG. 3, the solvent remaining on the emulsion side of the film 82 upon passing upwardly from the liquid knife means provided by the nozzles 85 and 86 is removed therefrom by engagement with the sponge-like absorbent drain roll 87 and the squeeze roll 89 serves to wring solvent from the sponge-like absorbent drain roll 87 and return the same to the tank 77. Solvent adhering to the squeeze roll 89 is removed therefrom by means of the drain brush 90. While this form of the invention removes the solvent from the emulsion side of the film 82, if it is found that the solvent adhering to the base side of the film 82 is sufficient to preclude adequate evaporation thereof in the drying chamber 91, such excess solvent may be removed by providing a drain brush, such as that shown at 30 in FIG. 1, for engaging the base side of the film and removing the excess solvent therefrom.

It will be seen that by the above described invention there has been provided a relatively simple, yet highly effective apparatus for cleaning film, such as relatively wide aerial photographic film and actual practice has shown that such film may be adequately cleaned to remove substantially all foreign material therefrom to a degree sufficient to permit enlargements limited only by the grain structure of the film and it has been found possible to clean such film at any desired rate of speed between three and sixty feet per minute depending upon the extent to which the film is contaminated. It has been found that it is entirely practical with this cleaning apparatus to remove foreign material from film down to a particle size of not greater than 0.5 micron and this highly effective cleaning procedure is possible at an entirely acceptable rate of speed. Furthermore, with the use of suitable solvent recovery apparatus, the loss of solvent is not at all prohibitive and the nature of the cleaning operation and removal of solvent from the film is such as to preclude damage to the film by reason of flutter, thermal shock or for any other reason.

The apparatus of this invention may also be utilized in connection with film processing apparatus in which considerable difficulty has been experienced in removing water from the film without spotting. It has been found that by feeding film directly from the processing apparatus to the cleaning apparatus of this invention that water carried on the film surface is completely removed during the cleaning operation as described above without leaving spots and, if necessary, further treatment may be provided for removing any water absorbed by the emulsion.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. Film cleaning apparatus comprising a film supply reel, a cleaning solvent receiving tank, a film guide roll disposed above said tank adjacent one side, a second film guide roll disposed in said tank adjacent the lower end, a drain roll disposed above said tank adjacent the opposite side, ultrasonic means for agitating solvent in said tank, a film take-up reel, said film passing from said supply reel over said first guide roll, downwardly into said tank and under said second guide roll, upwardly out of said tank and over said drain roll to said take-up reel, a liquid knife means for stripping contaminated solvent from said film and for rinsing foreign material therefrom, said knife means comprising a nozzle disposed on each side of said film between said drain roll and the surface of solvent in said tank, each nozzle having an elongated narrow slit for directing a thin solid sheet of solvent liquid downwardly and into engagement with each side of said film, the angle between each sheet of liquid and said film being not greater than fifteen degrees, a drain brush engaging the side of said film opposite said drain roll and a second drain brush engaging said drain roll, said drain brushes being disposed above said tank, whereby upon movement of film through said apparatus foreign material will be removed in said tank, contaminated solvent and additional foreign material will be removed by said liquid knife and additional solvent will be removed from said film by said first brush and drain roll and from said drain roll by said second brush, said additional solvent being returned to said tank.

2. Film cleaning apparatus comprising a film supply reel, a cleaning solvent receiving tank, a film guide roll disposed above said tank, a second film guide roll disposed in said tank adjacent the lower end, a drain roll disposed above said tank, ultrasonic means for agitating solvent in said tank, a film take-up reel, said film passing from said supply reel over said first guide roll, downwardly into said tank and under said second guide roll, upwardly out of said tank and over said drain roll to said take-up reel, a liquid knife means for stripping contaminated solvent from said film and for rinsing foreign material therefrom, said knife means comprising a nozzle disposed on each side of said film between said drain roll and the surface of said solvent in said tank, each nozzle having means for directing a thin solid sheet of solvent liquid downwardly and into engagement with each side of said film, the angle between each sheet of liquid and said film being not greater than fifteen degrees, a drain brush engaging the side of said film opposite said drain roll and a second drain brush engaging said drain roll, whereby upon movement of film through said apparatus foreign material will be removed in said tank, contaminated solvent and additional foreign material will be removed by said liquid knife and additional solvent will be removed from said film by said first brush and drain roll and from said drain roll by said second brush, said additional solvent being returned to said tank.

3. Film cleaning apparatus comprising a film supply reel, a cleaning solvent receiving tank, a film guide roll disposed above said tank, a second film guide roll disposed in said tank adjacent the lower end, a drain roll disposed above said tank, ultrasonic means for agitating solvent in said tank, a film take-up reel, said film passing from said supply reel over said first guide roll, downwardly into said tank and under said second guide roll, upwardly out of said tank and over said drain roll to said take-up reel, a liquid knife means for stripping contaminated solvent from said film and for rinsing foreign material therefrom, said knife means comprising a nozzle disposed on each side of said film between said drain roll and said tank, each nozzle having means for directing a thin solid sheet of solvent liquid downwardly and into engagement with each side of said film, the angle between each sheet of liquid and said film being not greater than fifteen degrees and means for removing solvent from said drain roll, whereby upon movement of film through said apparatus foreign material will be removed in said tank, contaminated solvent and additional foreign material will be removed by said liquid knife and additional solvent will be removed from said film by said drain roll, said additional solvent being returned to said tank.

4. Film cleaning apparatus as defined in claim 3 in which a second drain roll is disposed between said first drain roll and said liquid knife means, said second drain roll being offset with respect to said first drain roll, whereby one side of said film engages said second drain roll and the opposite side of said film engages said first drain roll, a drain brush engaging said first drain roll to remove solvent therefrom and a second drain brush engaging said second drain roll to remove solvent therefrom, the solvent removed by said brushes being returned to said tank.

5. Film cleaning apparatus as defined in claim 3 in which a second drain roll is disposed between said first drain roll and said liquid knife means and said second drain roll being offset with respect to said first drain roll, whereby one side of said film engages said second drain roll and the opposite side of said film engages said first drain roll, solvent removed from said film by said drain rolls being returned to said tank.

6. Film cleaning apparatus as defined in claim 3 in which said drain roll comprises a liquid absorbent sponge-like material, means for driving said drain roll, a squeeze roll engaging said drain roll to wring solvent therefrom and a drain brush engaging said squeeze roll, said brush serving to remove solvent from said squeeze roll and return the same to said tank.

References Cited in the file of this patent

UNITED STATES PATENTS

| 1,487,375 | Fuchs | Mar. 18, 1924 |
| 2,967,119 | Gutterman | Jan. 3, 1961 |

FOREIGN PATENTS

| 741,848 | Couquet et al. | Dec. 14, 1955 |